United States Patent

[11] 3,617,542

| [72] | Inventors | Robert A. Boehler;<br>Matthew R. Purvis, Jr, both of Downers Grove, Ill. |
|---|---|---|
| [21] | Appl. No. | 798,449 |
| [22] | Filed | Feb. 11, 1969 |
| [45] | Patented | Nov. 2, 1971 |
| [73] | Assignee | Nalco Chemical Company<br>Chicago, Ill. |

[54] REMOVAL OF PHOSPHATES FROM SEWAGE EFFLUENT
9 Claims, No Drawings

[52] U.S. Cl. ............................................ 210/18,
210/53
[51] Int. Cl. ............................................ C02b 1/20
[50] Field of Search ............................ 210/18, 52–54

[56] References Cited
UNITED STATES PATENTS

| 3,423,309 | 1/1969 | Albertson | 210/53 X |
| 3,480,144 | 11/1969 | Barth et al. | 210/18 X |
| 3,506,570 | 4/1970 | Wukasch | 210/53 X |

FOREIGN PATENTS

| 607,440 | 10/1960 | Canada | 210/53 |
| 662,534 | 5/1963 | Canada | 210/52 |

*Primary Examiner*—Michael Rogers
*Attorneys*—Johnston, Root, O'Keeffe, Keil, Thompson & Shurtleff, John G. Premo, Charles W. Connors and Morando Berrettini ABSTRACT: In sewage treatment wherein raw sewage containing phosphate is passed into a primary clarifier to remove the heavy solids and the effluent from the primary clarifier is subsequently discharged to a stream or subjected to biological secondary treatment, phosphates are removed by intimately mixing with the effluent from either primary or secondary treatment a high molecular weight, water soluble, linear, anionic polymer having a weight average molecular weight in excess of 100,000 in an amount sufficient to cause suspended solid particles, including said phosphate, to settle and increase the rate of settling, settling said solids, adding an aluminum compound to the supernatant liquid in sufficient amount to precipitate dissolved orthophosphate, and separating the settled precipitated solids along with bacteria.

REMOVAL OF PHOSPHATES FROM SEWAGE EFFLUENT

This invention relates to the treatment of waste waters and more particularly to the treatment of waste waters from sewage to remove phosphates, reduce biochemical oxygen demand (BOD) and to reduce bacteria in such waste waters.

It is known that many waste waters and particularly sewage waters contain phosphates which act as nutrients for bacteria and increase the BOD and bacterial count. An increase in the BOD decreases the amount of oxygen which is available in waters to which said waste waters are added thereby tending to destroy the life of plants and fish in such waters. It is therefore highly desirable to treat such waters before they are added to streams in order to reduce or eliminate the amount of phosphate, to reduce the BOD and to reduce unwanted biological overgrowth.

In sewage treatment one method used is to pass the raw sewage into a primary clarifier to remove the heavy solids and subsequently to subject the residual waste waters to a bacterial treatment such as an activated sludge treatment in order to destroy organic contaminants. The subsequent bacterial treatment is usually incapable of removing all phosphates. The rest of the phosphate remains in the waste water. Hence, unless these phosphates are removed when the waste water is discharged into streams, it introduces quantities of phosphates which can result in unwanted biological overgrowths.

It would be desirable to reduce the amount of such phosphate in treated waste waters and thereby reduce contamination and pollution.

One of the objects of the present invention is to provide a new and improved process for removing phosphates from waste waters and for reducing BOD and unwanted biological overgrowth.

Another object of the invention is to provide a new and improved process of the type described which can be employed in a sewage disposal system. Other objects appear hereinafter.

In accomplishing these objects in accordance with the invention, waste waters containing phosphate derived from sewage, for example, the effluent from a clarifier in a sewage treatment plant, are intimately mixed with a high molecular weight linear anionic polymer having a weight average molecular weight in excess of 100,000 in amount sufficient to cause suspended solid particles including said phosphate to settle and to increase the rate of settling, allowing said solids to settle, adding an aluminum compound, for example, sodium aluminate and/or alum, to the supernatant liquid in sufficient amount to precipitate dissolved orthophosphate and separating the settled and precipitated solids. In most sewage disposal processes of this type the heavy solids are removed in a primary clarifier and the effluent is subsequently subjected to a bacterial treatment, for instance, an activated sludge treatment, to modify the remaining organic matter. In this process by treating the final effluent so as to remove suspended phosphate as well as dissolved phosphate it is possible to reduce the BOD and the bacterial count of disposal waters.

The high molecular weight water soluble polymers which are employed in the practice of the invention can be derived by polymerizing olefinically unsaturated monomers. The monomer used in the polymerization can be one which gives a polymer containing hydrophilic groups so that the polymer is water soluble under the conditions of use. Two or more monomers can be used to produce copolymers containing sufficient hydrophilic groups to be water soluble under the conditions of use. Alternatively, the polymer can be partially hydrolyzed or otherwise modified to give it the desired hydrophilic properties. In general, the polymers employed for the purpose of the invention are linear polymers containing water solubilizing groups as side chains. The preferred water solubilizing groups are carboxy, carboxylate and amide groups, and it is desirable that at least some of the water solubilizing groups be anionic. It is usually preferable to neutralize the polymers with caustic alkali so that any free carboxy groups present on the polymer will be converted to carboxylate groups.

Copolymers of sodium acrylate and acrylamide comprising a fraction of 1 percent up to 95 percent by weight sodium acrylate, preferably 5 percent to 95 percent, and 95 percent to a fraction of 1 percent by weight acrylamide, preferably 95 percent to 5 percent, are especially useful for the purpose of the invention. Specific examples of such copolymers contain 5 percent sodium acrylate and 95 percent acrylamide, or 30 percent sodium acrylate and 70 percent acrylamide, or approximately 50 percent sodium acrylate and 50 percent acrylamide. Other polymers or copolymers of acrylic acid types which can be used are those obtained by polymerization of acrylic acid, methacrylic acid, sulfoethylacrylate, carboxyethylacrylate, or salts thereof, or copolymers thereof of the acids or salts obtained by suitable copolymerization with monomers, such as acrylamide, methacrylamide, acrylonitrile, methacrylonitrile, lower alkyl esters of acrylic acid, vinyl alkyl ethers, and the like. For the purpose of this invention the high molecular weight polymers should have a weight average molecular weight in excess of 100,000 and usually at least 2,000,000.

In the practice of the invention especially useful results have been obtained by employing high molecular weight copolymers of sodium acrylate and acrylamide containing 45 percent to 55 percent sodium acrylate and 55 percent to 45 percent acrylamide.

According to one method or practicing the invention a high molecular weight polymer of the type described can be added to the waste water containing both suspended and dissolved phosphate simultaneously with the addition of sodium aluminate or alum or both.

The dosage of polymer and aluminum compound is subject to some variation and can be determined by routine experiments. The dosage of polymer will usually be within the range of 0.25 to 5 mg./l. and the dosage of sodium aluminate and/or alum will depend upon the amounts theoretically required to react with any dissolved phosphate present to form aluminum phosphate.

The invention will be further illustrated but is not limited by the following examples in which the proportions are given by weight unless otherwise indicated.

EXAMPLE I

The liquid effluent from a primary clarifier of a sewage disposal plant was treated with one mg./l. of a copolymer of approximately 50 percent sodium acrylate and 50 percent acrylamide having a molecular weight in excess of 2,000,000, at various pH's. The pH was adjusted with sulfuric acid or sodium hydroxide. The raw effluent had a pH of 7.8 and contained 6.9 mg./l. of unfiltered phosphate, calculated as $PO_4$. At a pH of 6 the unfiltered phosphate was 6.4 mg./l. and the soluble orthophosphate was greater than 2 mg./l. as $PO_4$. At a pH of 6.5 the total unfiltered phosphate was 5.9 and the soluble orthophosphate was greater than 2. At a pH of 7.3 the unfiltered phosphate was 5.4 and the soluble orthophosphate was greater than 2. At a pH of 8.8 the unfiltered phosphate was 0.6 and the soluble orthophosphate was also 0.6. At this pH the BOD was 2.1 mg./l.

In each case the testing procedure involved mixing the copolymer with the effluent for 5 minutes at 100 r.p.m., followed by 10 minutes flocculation at 20 r.p.m. and a settling time of 10 minutes. At a pH greater than 8.5 the copolymer gave a very clear supernatant and a fast settling floc at a dosage of 1 mg./l. or above.

EXAMPLE II

The procedure was the same as in example I in that the effluent from a primary clarifier in a sewage disposal plant was treated at a pH of 8.8 with 1.0 mg./l. of the copolymer described in example I. The supernatant liquid was then treated with 10 mg./l. of sodium aluminate at a pH of 7 (adjusted with sulfuric acid) and the total unfiltered solids was 0.5. The total soluble orthophosphate was 0.3.

From examples I and II it will be seen that the addition of 1 mg./l. of the copolymer at a pH of 8.5 to 9 removes nearly all insoluble phosphates. All remaining phosphates, mainly in the orthoform, can be effectively removed by adding sodium aluminate at a pH of 6.5 to 7.0.

The waste water can also be given a combined treatment of alum, sodium aluminate and high molecular weight anionic polymer as shown by the following example.

EXAMPLE III

In this example alum, sodium aluminate and the copolymer described in example I were fed simultaneously to the waste effluent from the primary clarifier of a sewage disposal plant with the results shown in the following table.

TABLE

| | pH | Alum | Sodium Aluminate | Copolymer of Example I | Total Phosphate $PO_4$ mg./l. |
|---|---|---|---|---|---|
| Raw | 7.8 | | | | 38.4 |
| 1 | 7.1 | 100 | 10 | 0.2 | 5.1 |
| 2 | 6.85 | 100 | 10 | 0.2 | 5.1 |
| 3 | 6.45 | 100 | 10 | 0.2 | 5.1 |
| 4 | 5.65 | 100 | 10 | 0.2 | 6.3 |
| 5 | 6.7 | 150 | 10 | 0.2 | 3.0 |
| 6 | 6.85 | 150 | 10 | 0.2 | 3.3 |
| 7 | 6.8 | 150 | 10 | 0.2 | 3.4 |
| 8 | 6.9 | 150 | 10 | 0.2 | 2.9 |
| 9 | 7.0 | 120 | 10 | 0.2 | 4.1 |
| 10 | 6.8 | 120 | 10 | 0.2 | 3.4 |
| 11 | 6.5 | 120 | 10 | 0.2 | 3.9 |
| 12 | 6.3 | 120 | 10 | 0.2 | 4.3 |
| 13 | 6.8 | 200 | 10 | 0.2 | 0.3 |
| 14 | 6.3 | 200 | 10 | 0.2 | 0.3 |
| 15 | 5.8 | 200 | 10 | 0.2 | 0.3 |
| 16 | 6.7 | 100 | 20 | 0.2 | 7.7 |
| 17 | 6.6 | 100 | 20 | 0.2 | 9.4 |
| 18 | 6.3 | 100 | 20 | 0.2 | 8.6 |
| 19 | 5.9 | 100 | 20 | 0.2 | 8.6 |
| 20 | 5.8 | 100 | 20 | 0.2 | 9.7 |
| 21 | 6.5 | 100 | 20 | 0.2 | 8.8 |
| 22 | 6.2 | 100 | 20 | 0.4 | 7.5 |
| 23 | 6.7 | 100 | 20 | 0.6 | 5.9 |
| 24 | 7.0 | 100 | 20 | 0.4 | 6.9 |
| 25 | 7.0 | 100 | 20 | 0.6 | 8.1 |
| 26 | 6.7 | 100 | 20 | 0.8 | 8.7 |
| 27 | 6.3 | 100 | 20 | 1.0 | 8.4 |
| 28 | 8.5 | 100 | 20 | 1.0 | 2.1 |
| 29 | 7.5 | 100 | 20 | 1.0 | 7.7 |
| 30 | 6.0 | 100 | 20 | 1.0 | >10.0 |

The invention makes it possible to eliminate or greatly reduce both water insoluble phosphates and water soluble phosphates from waste disposal waters and to reduce the BOD and the bacterial count. As a specific illustration, in one case the sequential treatment of a primary effluent with 1 mg./l. of the copolymer of example I at a pH of 8.5-9.0 followed by treatment with 10-20 mg./l. of sodium aluminate at a pH of 6.5-7.0 reduced the bacterial count from $1.25 \times 10^6$ to $4 \times 10^4$ per ml.

The invention is applicable to the treatment of primary and/or secondary liquid effluents from sewage disposal plants.

We claim:

1. In the treatment of sewage disposal waste water containing phosphate, the process which comprises intimately mixing with said waste water a high molecular weight linear anionic polymer having a weight average molecular weight in excess of 100,000 in sufficient amount to cause suspended solid particles including said phosphate to settle out and to increase the rate of settling while maintaining a pH of at least 8.5, allowing said solids to settle thereby forming a supernatant liquid above said settled solids, and separating said solids from the liquid phase.

2. A process as claimed in claim 1 which is carried out at pH of 8.5 to 9.0.

3. A process as claimed in claim 1 in which an aluminum compound capable of reacting with dissolved orthophosphate to precipitate an insoluble phosphate is added to said supernatant liquid prior to the separation of said solids.

4. A process as claimed in claim 3 in which the addition of said aluminum compound is made to the supernatant liquid after said solids have settled and at a pH of 6.5 to 7.0.

5. A process as claimed in claim 1 in which said anionic polymer contains at least one group from the class consisting of carboxy, carboxylate and amide.

6. A precess as claimed in claim 1 in which said polymer consists essentially of 45 percent to 55 percent by weight sodium acrylate and 55 percent to 45 percent by weight acrylamide.

7. A process as claimed in claim 1 in which said polymer, sodium aluminate and alum are added simultaneously to said waste water.

8. In sewage treatment wherein raw sewage containing phosphate is passed into a primary clarifier to remove the heavy solids and the effluent from the primary clarifier is subsequently subjected to a bacterial treatment, the steps which comprise first intimately mixing with said effluent from the primary clarifier a high molecular weight linear anionic polymer having a weight average molecular weight in excess of 100,000 at a pH of 8.5 to 9 in amount sufficient to cause suspended solid particles including said phosphate to settle and to increase the rate of settling, allowing said solids to settle thereby forming a supernatant liquid above said settled solids, subsequently adding sodium aluminate to the supernatant liquid at a pH of 6.5 to 7 in sufficient amount to precipitate dissolved orthophosphate and separating the settled and precipitated solids prior to said bacterial treatment.

9. A process as claimed in claim 1 in which said polymer and an aluminum compound capable of reacting with dissolved orthophosphate to precipitate an insoluble phosphate are added to a sewage waste water which has been subjected to purification by bacterial treatment but which still contains suspended and dissolved phosphates, and the resultant solids are allowed to settle and are removed from the final liquid effluent.

* * * * *

UNITED STATES PATENT OFFICE
CERTIFICATE OF CORRECTION

Patent No. 3,617,542　　　　　　　　　Dated November 2, 1971

Inventor(s) Robert A. Boehler and Matthew R. Purvis, Jr.

It is certified that error appears in the above-identified patent and that said Letters Patent are hereby corrected as shown below:

Column 3, in the table, opposite "21", under "Copolymer of Example I", "0.2" should read -- 0.3 --.

Column 4, line 27, Claim 6, "precess" should read -- process --.

Signed and sealed this 25th day of April 1972.

(SEAL)
Attest:

EDWARD M. FLETCHER, JR.
Attesting Officer

ROBERT GOTTSCHALK
Commissioner of Patents